US005999091A

United States Patent [19]
Wortham

[11] Patent Number: 5,999,091
[45] Date of Patent: Dec. 7, 1999

[54] TRAILER COMMUNICATIONS SYSTEM

[75] Inventor: Larry C. Wortham, Garland, Tex.

[73] Assignee: HighwayMaster Communications, Inc., Dallas, Tex.

[21] Appl. No.: 08/904,170

[22] Filed: Jul. 31, 1997

Related U.S. Application Data

[63] Continuation-in-part of application No. 08/758,183, Nov. 25, 1996, Pat. No. 5,905,433.

[51] Int. Cl.⁶ ................................................. G08B 21/00
[52] U.S. Cl. .................... 340/431; 340/989; 340/825.06; 340/825.54
[58] Field of Search .................................. 340/431, 451, 340/452, 531, 310.02, 825.06, 989, 990, 425.5, 426, 825.54, 310.01

[56] References Cited

U.S. PATENT DOCUMENTS

| | | | |
|---|---|---|---|
| 3,646,580 | 2/1972 | Fuller et al. | 340/989 |
| 3,924,257 | 12/1975 | Roberts | 340/282 |

(List continued on next page.)

FOREIGN PATENT DOCUMENTS

| | | | |
|---|---|---|---|
| 2659159 | 9/1991 | France | G07C 5/08 |

OTHER PUBLICATIONS

"Preliminary RF Mini Transceiver—900 MHz 'Mini–Link'™," *Data Hunter*, Date Unknown, 2 pages.
"RFM® Virtual Wire® Development Kits" brochure, RF Monolithics, Inc., Date Unknown, 2 pages.
"RF products IC is Single–Chip DSSS Radio System for RFID" advertisement, Micron Communications, Inc., Date Unknown, 1 page.
"ID Technologies—All about RFID" Information from the Internet, *RFID Technologies*, Date Unknown, 3 pages.
"ID Technologies—How your business can benefit from RFID" Information from the Internet, *RFID Technologies*, Date Unknown, 2 pages.
"ID Technologies—How to get started with RFID" Information from the Internet, *RFID Technologies*, Date Unknown, 1 page.
"ID Technologies—What's new at ID Technologies" Internet Information, *RFID Technologies*, Date Unknown, 1 page.
"Telematics Applications Programme" Brochure, Promote—Chauffeur, Date Unknown, 7 pages.
"Track Vending Inventory Wirelessly," *Electronic Design*, Dec. 4, 1995, 1 page.
"CRL Creating the future" Brochure, Central Research Laboratories Limited, 1996, 4 pages.
"MicroStamp Engine™ Modulated Backscatter (MBS) Version Preliminary Data Sheet," *Micron Communications, Inc.*, 1996, 18 pages.
Roy Tarantino, "Adding Wireless Communication Capability to Embedded Systems," *Embedded Systems Programming*, Feb., 1996, 12 pages.
Richard Pell, Jr., "Wireless communications chip aims to expand RFID market," *Electronic Products*, Mar., 1996, 1 page.
Jim Mele, "Smart Trucks," *Fleet Owner*, Jun., 1996, 3 pages.
Stewart Siegel, "Smart Trailers," *Fleet Owner*, Jun., 1996, 4 pages.
Tom Moore, Smart Shops, *Fleet Owner*, Jun., 1996, 4 pages.
Robert Keenam, "Engine and Simulator Drive Low–Power 2.4–GHz RFID Ssytem," *Wireless Systems Design*, Aug., 1996, 2 pages.

(List continued on next page.)

*Primary Examiner*—Jeffery A. Hofsass
*Assistant Examiner*—Van T. Trieu
*Attorney, Agent, or Firm*—Baker & Botts, L.L.P.

[57] ABSTRACT

A trailer communications system (10) includes a tag unit (26) for location on a trailer (12). A reader unit (28) can be placed at a remote location. The tag unit (26) and the reader unit (28) communicate information in response to a predetermined event which occurs substantially simultaneously at both the trailer (12) and the remote location.

37 Claims, 6 Drawing Sheets

U.S. PATENT DOCUMENTS

| | | | |
|---|---|---|---|
| 4,065,750 | 12/1977 | Duncan et al. | 340/58 |
| 4,065,751 | 12/1977 | Stewart et al. | 340/58 |
| 4,097,840 | 6/1978 | Chappelle | 340/52 R |
| 4,328,494 | 5/1982 | Goodall | 340/870.18 |
| 4,658,508 | 4/1987 | Oberg | 33/333 |
| 4,679,158 | 7/1987 | Tate | 364/559 |
| 4,682,145 | 7/1987 | Brawner, Jr. | 340/52 |
| 4,688,244 | 8/1987 | Hannon et al. | 379/58 |
| 4,750,197 | 6/1988 | Denekamp et al. | 379/58 |
| 4,780,618 | 10/1988 | Wareman et al. | 307/9 |
| 4,784,403 | 11/1988 | Hawkins et al. | 280/432 |
| 4,797,948 | 1/1989 | Milliorn et al. | 455/54 |
| 4,804,937 | 2/1989 | Barbiaux et al. | 340/52 F |
| 4,831,539 | 5/1989 | Hagenbuch | 364/449 |
| 4,851,822 | 7/1989 | Barnett | 340/635 |
| 4,884,208 | 11/1989 | MArinelli et al. | 364/460 |
| 4,897,642 | 1/1990 | DiLullo et al. | 340/825.06 |
| 4,943,798 | 7/1990 | Wayne | 340/443 |
| 4,952,908 | 8/1990 | Sanner | 340/429 |
| 4,955,000 | 9/1990 | Nastrom | 367/117 |
| 4,988,974 | 1/1991 | Fury et al. | 340/431 |
| 5,008,859 | 4/1991 | Cyr | 367/2 |
| 5,025,253 | 6/1991 | DiLullo et al. | 340/825.06 |
| 5,068,654 | 11/1991 | Husher | 340/903 |
| 5,090,779 | 2/1992 | Kramer | 303/7 |
| 5,131,038 | 7/1992 | Puhl et al. | 340/825.31 |
| 5,142,278 | 8/1992 | Moallemi et al. | 340/825.06 |
| 5,191,328 | 3/1993 | Nelson | 340/870.06 |
| 5,204,819 | 4/1993 | Ryan | 364/465 |
| 5,278,563 | 1/1994 | Spiess | 342/44 |
| 5,282,641 | 2/1994 | McLaughlin | 280/432 |
| 5,289,160 | 2/1994 | Fiorietta | 340/447 |
| 5,306,953 | 4/1994 | Weiner | 307/10.1 |
| 5,347,274 | 9/1994 | Hassett | 340/988 |
| 5,373,482 | 12/1994 | Gauthier | 367/99 |
| 5,374,918 | 12/1994 | Tharbs | 340/438 |
| 5,397,924 | 3/1995 | Gee et al. | 307/9.1 |
| 5,434,552 | 7/1995 | Ems | 340/431 |
| 5,436,612 | 7/1995 | Aduddell | 340/438 |
| 5,442,343 | 8/1995 | Cato et al. | 340/825.35 |
| 5,442,810 | 8/1995 | Jenquin | 455/66 |
| 5,453,932 | 9/1995 | Brabec | 364/424.07 |
| 5,455,557 | 10/1995 | Noll et al. | 340/431 |
| 5,477,207 | 12/1995 | Frame, Sr. et al. | 340/431 |
| 5,483,965 | 1/1996 | Wiener et al. | 128/661.03 |
| 5,488,352 | 1/1996 | Jasper | 340/431 |
| 5,506,584 | 4/1996 | Boles | 342/42 |
| 5,513,111 | 4/1996 | Worhtam | 364/460 |
| 5,519,621 | 5/1996 | Wortham | 364/460 |
| 5,528,232 | 6/1996 | Verma et al. | 340/825.54 |
| 5,539,810 | 7/1996 | Kennedy, III et al. | 379/59 |
| 5,541,604 | 7/1996 | Meier | 342/42 |
| 5,544,225 | 8/1996 | Kennedy, III et al. | 379/59 |
| 5,550,548 | 8/1996 | Schuermann | 342/42 |
| 5,615,229 | 3/1997 | Sharma et al. | 375/259 |
| 5,677,667 | 10/1997 | Lesesky et al. | 340/431 |
| 5,686,902 | 11/1997 | Reis et al. | 340/825.54 |

OTHER PUBLICATIONS

"Navigato International Announces Tailtag™" TruckNet—Trucking News Internet Information, *Sziener Interactive*, Apr. 12, 1996, 1 page.

Robert Deierlein, "What Kind of Name is 'TruckMux'?," *Private Carrier*, Oct., 1996, 2 pages.

"Integrated RF and Digital Solutions for Remote Keyless Entry," *Showcase*, Oct., 1996, 2 pages.

*IDSystems* Catelog page, Dec., 1996, 1 page.

"Connector Warning," *Heavy Duty Trucking*, Jan., 1997, 1 page.

TRAILER COMMUNICATIONS SYSTEM

RELATED APPLICATIONS

This application is a continuation-in-part of U.S. patent application Ser. No. 08/758,183, filed Nov. 25, 1996, by Larry C. Wortham and entitled *Trailer Communications System*, now U.S. Pat. No. 5,905,433, the contents of which are hereby incorporated by reference.

TECHNICAL FIELD OF THE INVENTION

This invention relates generally to the field of data communications, and more particularly to a trailer communications system.

BACKGROUND OF THE INVENTION

In recent years, due to their versatility, trailers have evolved as a preferred way to move goods from one location to another. For example, trailers can be carried or transported in a number of ways, such as over roadways by tractor, over railways on the back of rail cars, or over waterways by ships or barges. In addition, various devices, such as refrigeration units, humidifiers, and anti-shock devices, can be incorporated into trailers for the transport of different products, such as perishable foods, electronics, antiques, chemicals, etc.

In order to monitor, track, control, or otherwise manage such trailers, it is often desirable to communicate with the trailers during transport. Accordingly, various systems were previously developed for transmitting and receiving information from a trailer. These prior systems have proven to be inadequate for one reason or another. For example, some prior systems employed techniques which generated "cross-talk." Cross-talk occurs when one receiving device receives signals which are intended for another receiving device. Cross-talk may result in the mishandling of information conveyed by the signals. Also, despite the presence of the prior systems, trailers were often misplaced or lost. This was especially problematic at any location where the mode of transportation was altered, such as a shipping yard. In addition, in prior systems, the kind and amount of information communicated to and from trailers was extremely limited. Furthermore, prior systems did not consolidate information from a plurality of trailers at a central location, but rather supported communication only proximate each individual trailer, such as in a vehicle transporting the trailer. Previously developed systems also suffered in that they operated in a single mode which caused the systems to constantly consume power, thereby draining any associated power source. This required frequent replacement of the power source, or alternatively, the use of a relatively large source which could supply the needed power.

SUMMARY OF THE INVENTION

In accordance with the present invention, the disadvantages and problems associated with prior communication systems for trailers have been substantially reduced or eliminated.

According to an embodiment of the present invention, a trailer communications system includes a tag unit for location on a trailer. A reader unit can be placed at a remote location. The tag unit and the reader unit communicate information in response to a predetermined event which occurs substantially simultaneously at both the trailer and the remote location.

According to another embodiment of the present invention, a tag unit, which operates in either an inactive mode or an active mode, may be located in or on a trailer. The tag unit includes a memory, an activating event detector, a processor, and a transmitter. The memory stores information relating to the trailer. The activating event detector can detect an activating event. The processor is coupled to the memory and the activating event detector. The processor transitions the tag unit from inactive mode to active mode in response to the detection of an activating event. The transmitter is coupled to the processor and can transmit the information stored in the memory in response to the detection of the activating event by the activating event detector.

According to yet another embodiment of the present invention, a method for communicating with a trailer comprises the following steps: detecting a predetermined event which occurs substantially simultaneously at both the trailer and a remote location; and communicating information from a tag unit on the trailer to a reader unit at the remote location in response to the detection of the predetermined event.

Important technical features of the present invention include synchronizing communication between a trailer and a remote location based upon an event which occurs substantially simultaneously at both the trailer and the remote location. In particular, after such a synchronization event occurs, a window of time is provided for the transmission and receipt of signals. All signals received during this window of time are considered to convey or contain valid information. Signals received outside of the window are considered to convey or contain invalid information. In one embodiment, the synchronization may be supported utilizing a signal, such as a brake signal, carried over a standard seven-pin connector between a trailer and a vehicle to which the trailer is coupled. Synchronization ensures that interference, spurious signals, cross-talk, and the like are not processed in the same manner as signals which are intended for receipt.

Another technical advantage of the present invention includes communicating a variety of information at a trailer. This information may include trailer identification, status, alarm, and control information, all of which can be transmitted to or received from a central host or a network services center (NSC). In addition, position determining information can be generated proximate the trailer and relayed to the central host. Consequently, the monitoring, control, tracking, or management of the trailer is facilitated.

Still another important technical advantage of the present invention includes providing different power modes for a tag unit which communicates information for a trailer. In particular, such a tag unit may have an active mode and an inactive mode. In the inactive mode, the tag unit is "powered down," thereby conserving power. In the active mode, the tag unit is "powered up" so that it may transmit and receive information. The tag unit is transitioned or "awakened" from the inactive mode to the active mode by any of a number of activating events. These activating events may include a synchronization event, a ping event, an alarm event, or the lapse of a predetermined interval.

Yet another important technical advantage includes providing communication between trailers which are located in close proximity to each other. Each trailer may relay information that it collects or generates to all trailers within its transmission range. Furthermore, trailers which are outside of the transmission range of a particular trailer may receive the information of that trailer from any intermediate trailer or trailers. In this manner, all trailers within a certain area may be imbued with the same information. Consequently, this information can be obtained from any of the trailers.

Other technical advantages are readily apparent to one skilled in the art from the following figures, description, and claims.

BRIEF DESCRIPTION OF THE DRAWINGS

For a more complete understanding of the present invention, and for further features and advantages, reference is now made to the following description taken in conjunction with the accompanying drawings, wherein like reference numerals represent like parts, in which.

DETAILED DESCRIPTION OF THE INVENTION

The present invention and its advantages are best understood by referring to FIGS. 1–8 of the drawings, like numerals being used for like and corresponding parts of the various drawings.

Figure 1:
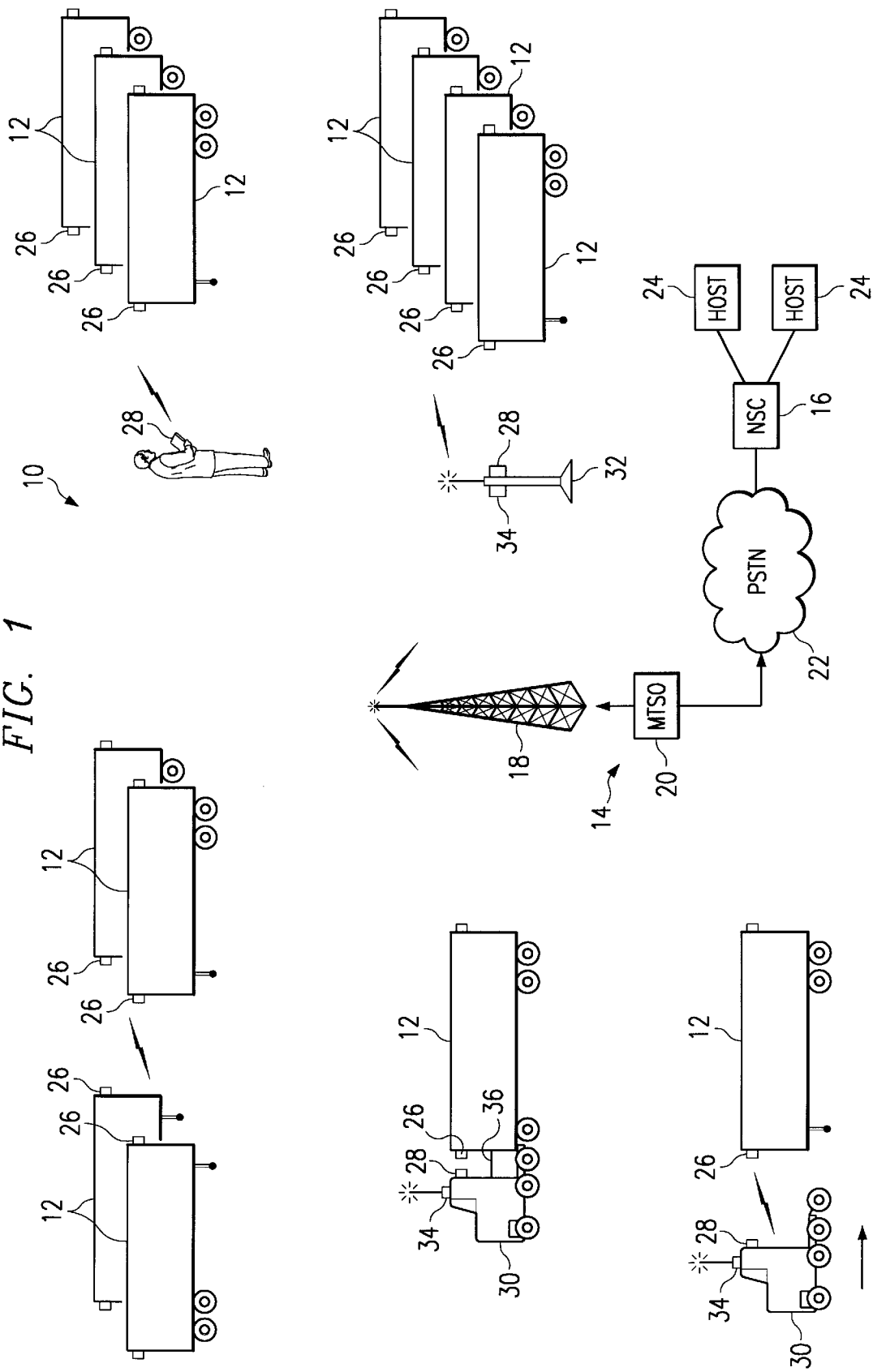
FIG. 1 illustrates a system for communicating information associated with various trailers in accordance with the teachings of the present invention.

FIG. 1 illustrates a system 10 for communicating information associated with one or more trailers 12 in accordance with the teachings of the present invention. Generally, system 10 may comprise a network of land-based transmission towers, spaced-based satellite transponders, or a combination of communications hardware in space or on land. As shown, system 10 may include a cellular system 14 which is linked to a network services center (NSC) 16. Cellular system 14 may have specific area of coverage over which it operates and may comprise a transmitter 18 coupled to a mobile telephone switching office (MTSO) 20. MTSO 20 can be coupled to a public switched telephone network (PSTN) 22, which is coupled to NSC 16. In other embodiments, system 10 may include any other suitable communication system, such as a specialized mobile radio (SMR) system or a personal communications service (PCS). Transmissions over system 10 may be analog or digital without departing from the scope of the invention.

NSC 16 can be coupled to one or more hosts 24. In one embodiment, NSC 16 and hosts 24 may be associated with one or more trucking companies, delivery companies, or any other entities which operate, own, use, or otherwise, manage trailers 12. NSC 16 and hosts 24, either alone or in combination, perform the management and control functions for one or more trailers 12.

NSC 16 and/or hosts 24 receive various information relating to trailers 12 over system 10. As explained below in more detail, this information may include trailer identification information, status information, alarm information, positioning information, or any other suitable information. Furthermore, various information can be generated at NSC 16 and/or hosts 24 and then transmitted to trailers 12. Such information may include control information for trailers 12, also explained below. Accordingly, information received from and transmitted to a plurality of trailers 12 can be consolidated, input, reported, or displayed at a central location in order to facilitate management, tracking, and control of trailers 12.

Each trailer 12 generally functions to contain and transport cargo from one location to another. In some cases, this cargo can be sensitive to one or more containment or transport conditions, such as humidity, pressure, temperature, shock, and the like. For example, trailers 12 can be used to carry perishable goods, chemicals, explosives, artifacts, or any other cargo which is sensitive to containment or transport conditions. Consequently, various conditioning devices, such as refrigeration units, humidifiers, and anti-shock devices, can be incorporated into trailers 12 to maintain conditions within certain critical levels during transport so that such sensitive cargo is not ruined, harmed, destroyed, or otherwise damaged. Various sensors may be provided on board each trailer 12 in order to monitor the conditions of that trailer.

In accordance with the present invention, each trailer 12 may be equipped with a tag unit 26, which can be mounted on or in that trailer 12. Each tag unit 26 functions to generate, collect, receive, store, process, and/or transmit information relating to the trailer 12 on which it is located. This information includes, but is not limited to, identification information, status information, alarm information, and control information. Identification information may specify an alpha-numeric code, a name, or any other appropriate information for uniquely identifying a trailer 12. Status information may comprise current readings for various environmental conditions, such as temperature, humidity, pressure, shock, or the like, on board a trailer 12. Status information may also specify the status of other conditions on a trailer, such as the fact that all doors on the trailer are secured, that the tires of the trailer are sufficiently inflated, or that the brake lines for the trailer do not have any leaks. Alarm information may include information for alerting an operator, such as the driver of a vehicle, when conditions on board a trailer exceed or fall below a specified critical level. Furthermore, the alarm information may also identify any of a number of other events which may occur on a trailer 12, such as the opening of a door or the failure of a brake. Control information can, for example, be used to update or adjust specified critical levels of various conditions on board a trailer 12. To collect and store the information described above, each tag unit 26 comprises suitable memory devices and interfaces to sensors located on board the corresponding trailer 12.

Each tag unit 26 may include suitable equipment for communicating at radio frequency (RF), such as frequencies of 315 MHz, 434 MHz, 915 MHz, or any other frequencies approved by the Federal Communications Commission (FCC) for low-power, intermittent duty transmissions. In one embodiment, the tag units 26 may utilize narrow-band ultra-high frequency (UHF) components, thereby supporting a transmission scheme in which costs and complexity are minimal. Furthermore, the present invention contemplates that the tag units 26 can operate with spread spectrum RF components as well. Each tag unit 26 will have a particular communications range (i.e., transmission and receipt) which is determined by the components with which it is implemented. Each tag unit 26 may be equipped with one or more devices for detecting various activating events, such as a synchronization event, a ping event, or an alarm event, which initiate communication in the tag units 26, as explained herein. An exemplary embodiment of a tag unit 26 is illustrated and described below in more detail with reference to FIG. 2.

The present invention contemplates that tag units 26 can operate in various modes, wherein each mode is defined by the amount of power consumed. In an inactive mode, the tag unit is "powered down," thereby conserving power. In an active mode, the tag unit is "powered up" so that it may transmit and receive information. The tag unit is transitioned or "awakened" from the inactive mode to the active mode by any of the activating events mentioned above.

Tag units 26 may communicate with each other to relay information collected, generated, or otherwise possessed by each. In particular, if a number of tag units 26 are located on separate trailers 12 in relatively close proximity to each other, each of these tag units 26 may report various information to other tag units within its transmission range. This information may include identification, status, alarm, and control information for both the transmitting trailer 12 and other trailers 12 with which the tag unit 26 of that trailer previously communicated. Tag units 26 which are outside of the transmission range of one particular tag unit 26 may nonetheless receive the information reported by that tag unit via other tag units 26 which are located on trailers 12 therebetween. Each tag unit 26 may store, at least temporarily, all information which it receives from other tag units.

A number of reader units 28 are provided throughout system 10. Reader units 28 may function to communicate, relay, process, and/or store information for one or more trailers 12. Each reader unit 28 may include suitable equipment for transmitting and receiving at radio frequency (RF), such as frequencies of 315 MHz, 434 MHz, and 915 MHz, or any other suitable frequency. Also, reader units 28 may each comprise one or more devices for initiating communication with tag units 28 and for storing all or any portion of the above information. An exemplary embodiment of a reader unit 28 is described below in more detail with reference to FIG. 3.

Reader units 28 may be carried on board any vehicle operable to transport one or more trailers 12, including tractors, airplanes, boats, barges, ships, and rail cars. As illustrated in FIG. 1, an exemplary vehicle can be a tractor 30. Reader units 28 can also be mounted on or in various stationary objects, such as a stand 32, which may be located at any site where trailers 12 are stored or switched between transporting vehicles, such as a trailer yard. In addition, a reader unit 28 can be implemented as a hand-held, portable device which may be carried by a person. Each reader unit 28 is operable to communicate with one or more tag units 26 mounted on trailers 12. Accordingly, whenever a trailer 12 is separated from one vehicle and either stored, or alternatively, coupled to or transported by another vehicle, a reader unit 28 may be provided to support communication with the tag unit 26 on board the trailer 12.

Communication with each tag unit 26, either by another tag unit 26 or a reader unit 28, can be initiated upon the occurrence of any of a number of predetermined activating events. An activating event serves to activate or "wake-up" a tag unit 26 from inactive mode to active mode. Exemplary activating events include a synchronization event, a ping event, an alarm event, or the lapsing of a predetermined interval. A synchronization event may comprise any event which occurs substantially simultaneously on both trailer 12 and a vehicle to which such trailer is connected, such as a tractor 30. A synchronization event can be supported by a standard seven-pin connector 36 between a trailer 12 and a tractor 30. Such a seven-pin connector 36 typically is used to coordinate electrical components on a tractor 30 and a trailer 12, such as brake lights, turn lights, flashers, or running lights, so that the tractor/trailer combination can be operated safely and effectively. The synchronization event may comprise the detection of a signal over the seven-pin connector 36, or alternatively, the coupling/decoupling of the trailer end of a seven-pin connector 36 to/from the vehicle end of the connector. Synchronization ensures each of tag unit 26 and reader unit 28 that it is communicating with the appropriate unit. A ping event may comprise the receipt of a ping signal by a sensor of the tag unit 26. Such sensor can be, for example, an ultrasonic sensor which functions to receive an ultrasonic signal that is broadcast from a reader unit 28. An alarm event may occur when sensors on board a trailer 12 detect that one or more conditions have exceeded or fallen below predetermined critical levels. The periodic interval can be every fifteen minutes, half of an hour, hour, or any other suitable interval.

A separate relay unit 34 may be coupled to each of a number of reader units 28. Relay units 34 may communicate with cellular system 14 in order to relay all of the various information described above between trailers 12 and NSC 16 and/or hosts 24. An exemplary embodiment of this functionality is described in U.S. Pat. No. 5,544,225 issued on Aug. 6, 1996, to Kennedy, III, et al., entitled "Data Messaging In A Cellular Communications Network," the entire disclosure of which is specifically incorporated herein by reference. Relay units 34 may also comprise interfaces which support the entry and presentation of information on board a vehicle.

Relay units 34 may support the location of trailers 12 via reader units 26. In particular, each relay unit 34 may be disposed proximate the reader units 26 with which it is associated. In one embodiment, each relay unit 34 associated with a reader unit 28 that is mounted on a stationary object may contain positioning information specifying the geographic position of the stationary object. Each relay unit 34 associated with a reader unit 28 that is mounted on a vehicle may include a mobile positioning receiver operable to receive position determining information from a positioning system. In general, a positioning system comprises a plurality of space-based or land-based transmitters that emit information which can be used to determine position. The position determining information comprises accurate position and pseudo-range data represented by the time of arrival of position determining information from a positioning system to relay unit 34. A positioning system may be implemented as a land-based LORAN-C, a space-based GPS, a dead reckoning system, an inertial navigation system, or any other appropriate positioning technology. The positioning information stored in or generated by a relay unit 34 may be transmitted to NSC 16 and/or hosts 24.

In operation, a separate tag unit 26 is provided and initialized for each trailer 12. Initialization of each tag unit 26 may include storing an identification for the corresponding trailer 12 into a memory of the tag unit 26. Trailers 12 are then used to transport cargo, during which information relating to such trailers can be collected, generated, and/or stored by the corresponding tag units 26. This information may include, but is not limited to, condition information and alarm information. For a significant portion of the time during which it is operating, each tag unit 26 may be in an inactive mode to conserve power. Upon the occurrence of an activating event, such as a synchronization event, a ping event, an alarm event, or the lapse of a predetermined interval, a tag unit 26 will awaken to transmit any of the information which it has collected, generated, or stored, including identification information, condition information, and alarm information for a corresponding trailer 12. Also, at any time during its operation, each tag unit 26 may receive information, such as control information generated or input at NSC 16 or hosts 24. Communication of information to and from each tag unit 26 is supported by other tag units 26, reader units 28, relay units 34, and cellular system 14. Relay units 34 may append position determining information to the other information. Accordingly, the present invention facilitates the monitoring, tracking, control, or management of trailers 12 at NSC 16 and/or host 24.

In one embodiment, the position determining information and trailer identification information received at host 24 and/or NSC 16 allows the NSC 16 and host 24 to locate each trailer 12, thereby eliminating or substantially reducing the problem of trailers being lost or misplaced. In particular, NSC 16 or hosts 24 can broadcast a request for locating any trailer 12 which has been deemed to be lost or misplaced. Relay units 34 and reader units 28 cooperate to relay this request to any tag units 26 in communication with the reader units 28. Each of these tag units 26 may poll other tag units 26 in close proximity in order to establish the identity of all trailers 12 in a particular area. After polling, each tag unit 26 will possess identification information for all trailers 12, which may include the trailer 12 deemed to be lost or misplaced. The identification information can be retrieved or transmitted out of any of the tag units 26, and relayed, via reader units 28 and relay units 34, back to NSC 16 or hosts 24, thereby effectively "finding" the missing trailer 12.

Figure 2:
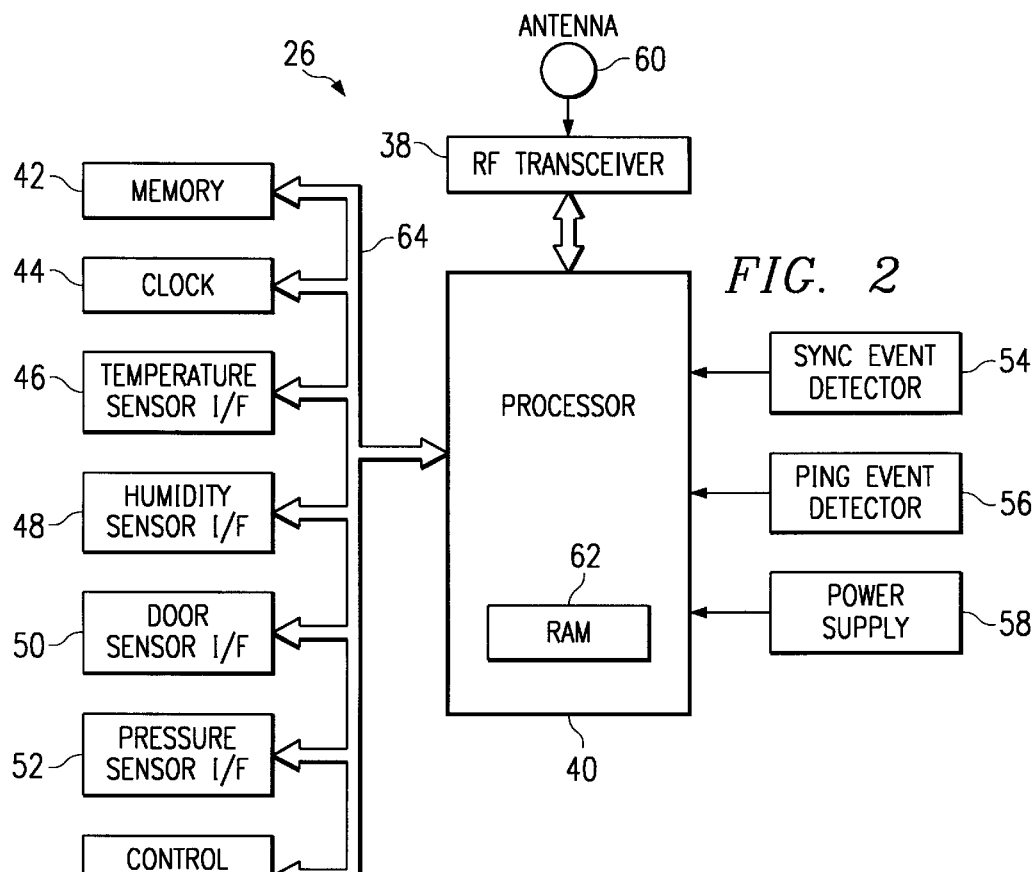
FIG. 2 is a schematic block diagram of an exemplary embodiment for a tag unit in accordance with the present invention.

FIG. 2 is a schematic block diagram for an exemplary embodiment of a tag unit 26 in accordance with the present invention. As described above, tag unit 26 can be located on a trailer 12 and may provide or support the collection, generation, processing, transmission, and/or receipt of various information relating to trailer 12, including trailer identification, status, and alarm information. As shown, tag unit 26 may include a radio frequency (RF) transceiver 38, a processor 40, a memory 42, a clock 44, a temperature sensor interface (I/F) 46, a humidity sensor I/F 48, a control I/F 53, a door sensor I/F 50, a pressure sensor I/F 52, a synchronization event detector 54, a ping event detector 56, and a power supply 58.

RF transceiver 38 may be implemented as any suitable transceiver operating at radio frequency. Frequencies for RF transceiver 38 can be 315 MHz, 434 MHz, 915 MHz, or other FCC-approved bands for low power, intermittent duty transmissions. Generally, the range requirements for communication—i.e., the distance between a tag unit 26 and a device with which it communicates—may only be a few feet. For example, the distance between a trailer 12, on which a tag unit 26 is located, and a tractor 30, on which a reader unit 28 may be located, is five to ten feet. Thus, in one embodiment, RF transceiver 38 utilizes or operates at a narrow band, ultra-high frequency (UHF) transmission scheme, thereby minimizing costs and complexity. In some cases, such as when two trailers 12 are being pulled by a single tractor 30, the range requirement may be 50 to 75 feet in order for the reader unit 28 on the tractor 30 to communicate with a tag unit 26 located on the more distant trailer 12. Thus, in another embodiment, RF transceiver 38 may comprise spread spectrum RF components when greater range and noise immunity are required. RF transceiver 38 supports bi-directional communication so that tag unit 26 may both transmit and receive information. It should be understood, however, that in another embodiment, tag unit 26 may comprise an RF transmitter rather than a transceiver; in this case, tag unit 26 may transmit information but cannot receive it. RF transceiver 38 is coupled to an antenna 60 for the transmission and receipt of RF signals.

Processor 40 is coupled to RF transceiver 38 and controls the operation of tag unit 26. Processor 40 may be implemented as any suitable microprocessor, such as a model MC68HC705J1A microprocessor manufactured by MOTOROLA. Processor 40 supports such functions as demodulating signals received at RF transceiver 38, activating and initiating transmission of signals out of tag unit 26 upon detection of various activating events, and detecting or correcting errors in the received or transmitted signals. Processor 40 also provides bus control for a bus 64 within tag unit 26. Processor 40 may include internal memory, such as random access memory (RAM) 62, for storing data or software. The software may specify various critical levels for conditions on board a trailer 12, according to the cargo being transported. For example, the software can specify an upper control temperature of 40° F. and a lower control temperature of −30° F. if the cargo comprises frozen foods. Similarly, the software can specify particular upper and lower humidity levels for tobacco products, such as cigars. Processor 40 is operable to run the software.

Bus 64 connects processor 40 to various other components of tag unit 28; as shown, these components include memory 42, clock 44, temperature sensor I/F 46, humidity sensor I/F 48, door sensor I/F 50, pressure sensor I/F 52, and control I/F 53. Bus 64 may comprise an RS-422 connection, a J1708 twisted pair connection, an intelligent interface for computers, or any other suitable bus.

Memory 64 may be implemented as any suitable memory, such as random access memory (RAM), read-only memory (ROM), or other suitable volatile or non-volatile memory. Memory 42 functions to store information, such as, for example, the alarm information, identification information, status information, or control information described above. Furthermore, memory 42 may store any other suitable information, such as interval information. Interval information can specify a predetermined interval, the lapse of which triggers tag unit 26 to transmit any of the other information that it has collected or generated.

Clock 44 may be implemented as any suitable device operable to measure the passage of time. In one embodiment, clock 44 supports the measurement of real-time and comprises an oscillator circuit having a piezoelectric crystal. Clock 44 may generate an interval timer signal for input into processor 40. This signal can be generated after the lapse of a predetermined interval.

Temperature sensor I/F 46, humidity sensor I/F 48, door sensor I/F 50, and pressure sensor I/F 52 are coupled to one or more sensors located on trailer 12. These sensors support the generation of status and alarm information by tag unit 26. The sensors may include thermometers, barometers, accelerometers, and other sensors for detecting the temperature, humidity, pressure, shock, or any other environmental conditions which may effect cargo within trailer 12. The sensors may also include various sensors to measure, detect, or monitor other events or conditions on board trailer 12, such as load weight, tire pressure, door openings or closings, etc. It should be understood that the sensors described above are provided by way of example only, and that in other embodiments, other sensors in addition to, or instead of, such sensors may be provided. Sensor I/Fs 46–52 provide processor 40 with up-to-date readings from the sensors. Sensor I/Fs 46–52 also support the detection of alarm events which serve to activate tag unit 26. Each sensor I/F 46–52 may output its own alarm signal.

As a complement to sensor I/Fs 46–52, tag unit 26 may comprise one or more control interfaces 53. These control interfaces 53 support the input of control information into various conditioning devices, such as humidifiers, refrigeration units, anti-shock devices, etc., which are operable to adjust or modify conditions on board trailer 12. Thus, for example, if an alarm signal is generated because the temperature on board trailer 12 is too high, control information may be sent, via a suitable control interface, to a refrigeration unit in order to lower the temperature.

Synchronization event detector 54 is coupled to processor 40. Synchronization event detector 54 functions generally to detect a synchronization event, which is used to synchronize transmission or receipt of information between tag unit 26 and a reader unit 28. Preferably, this event is one which may occur substantially simultaneously on both a vehicle and a trailer 12. In one embodiment, the synchronization event may comprise an event supported by a standard seven-pin connector 36, such as a brake signal, a turn signal, a hazard signal, or any other signal supported by the seven-pin connector 36. Accordingly, synchronization event detector 54 may be coupled to the wiring of the standard seven-pin connector 36; those skilled in the art of trailer communications understand that this coupling can be accomplished with a hardwire connection between the synchronization event detector 54 and any wire or combination of wires supporting the pins of the seven-pin connector 36. Synchronization event detector may generate a tag synchronization event signal, which is input into processor 40.

Ping event detector 56 is also coupled to processor 40. Ping event detector 56 generally functions to detect a ping event, such as an ultrasonic signal transmitted by a reader unit 28. Ping event detector 56 may output a ping-in signal. The ping-in signal can be used to activate tag unit 26 to initiate communication or transmission of information, such as status information and identification information. In one embodiment, ping event detector may comprise an ultrasonic receiver, which may have a limited arc for reception. This limited arc of reception, which can be between sixty to one hundred degrees, reduces the opportunity for receipt of spurious signals. In another embodiment, ping event detector may comprise a RF receiver.

Power supply 58 is coupled to processor 40. Power supply 58 functions as a power source for tag unit 26. Power supply 58 may be implemented as a lithium battery, a solar cell, or any suitable device or combination of devices for supplying power.

Figure 3:
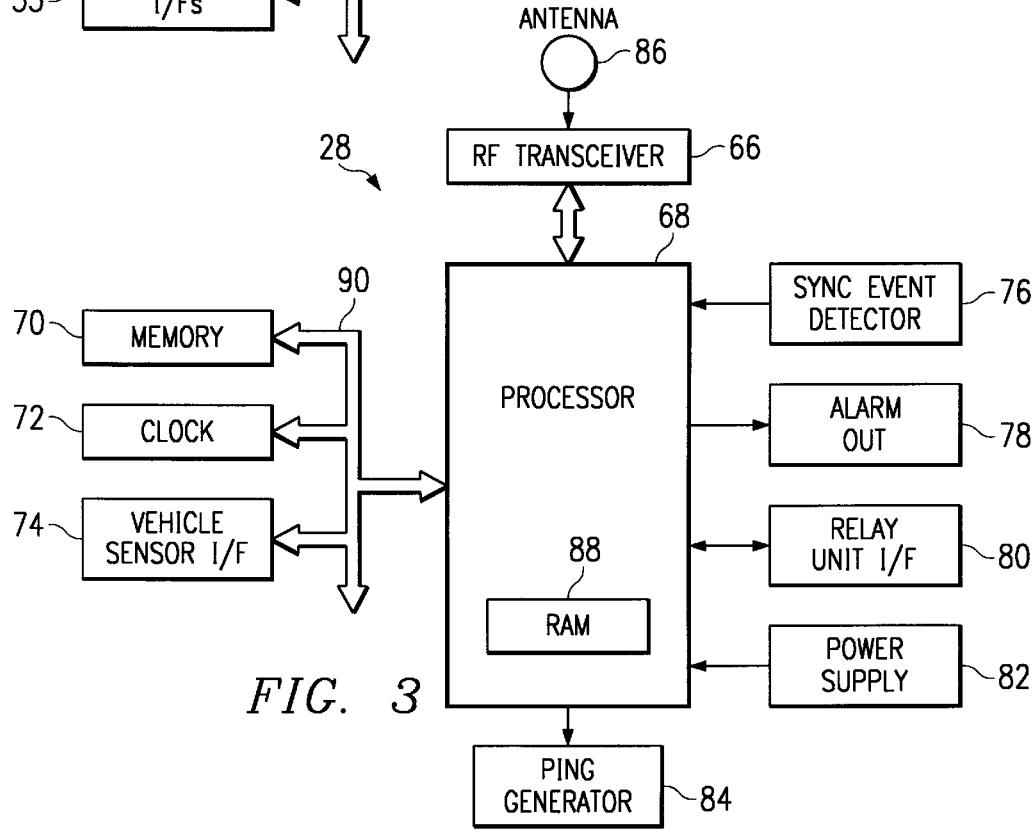
FIG. 3 is a schematic block diagram for an exemplary embodiment of a reader unit in accordance with the present invention.

FIG. 3 illustrates a schematic block diagram of an exemplary embodiment of a reader unit 28 in accordance with the present invention. As shown, reader unit 28 may include an RF transceiver 66, a processor 68, a memory 70, a clock 72, a vehicle sensor interface (I/F) 74, a synchronization event detector 76, an alarm out module 78, a relay unit interface (I/F) 80, a power supply 82, and a ping generator 84.

RF transceiver 66 generally supports the receipt and transmission of information to and from reader unit 28. Like RF transceiver 38 on tag unit 26, RF transceiver 66 may comprise a transceiver operating at an FCC-approved band, such as 315 MHZ, 434 MHZ, 915 MHZ, or the like. In one embodiment, RF transceiver 66 may comprise suitable components for operating in a narrow band, ultra-high frequency (UHF) transmission scheme. In another embodiment, RF transceiver 66 may comprise spread spectrum RF components which support greater range and provide more immunity to noise. RF transceiver 66 supports bi-directional communication so that reader unit 28 may both transmit and receive information. It should be understood, however, that in another embodiment, reader unit 28 may comprise an RF receiver rather than a transceiver, in which case, reader unit 28 may receive information but cannot transmit it. RF transceiver 66 is coupled to an antenna 86 for the transmission and receipt of RF signals.

Processor 68 is coupled to RF transceiver 66. Like processor 40 in tag unit 26, processor 68 may be implemented as an eight-bit microprocessor, such as a model MC68HC705J1A manufactured by MOTOROLA. Processor 68 controls the operation of reader unit 28 and may support a number of different functions, such as demodulating signals received at RF transceiver 66, activating and initiating transmission of signals out of reader unit 28, detecting or correcting errors in the received and transmitted signals, and protocol handling. Processor 68 may also provide bus control for a bus 90 within reader unit 28. Processor 68 may have an internal memory 88, which as shown, can be implemented as a random access memory (RAM). Internal memory 48 stores operating data and/or software, which can be utilized by or run on processor 68.

Bus 90 connects processor 68 to each of memory 70, clock 72, and vehicle sensor I/F 74, as well as any other suitable functional units. Bus 90 can be implemented as an RS-422 connection, a J1708 twisted pair connection, an intelligent interface for computers, or any other suitable bus connection.

Memory 70 may be implemented as any suitable volatile or non-volatile memory, such as random access memory (RAM) or read-only memory (ROM). Memory 70 functions to store various information for use within reader unit 28, and/or transmission or downloading out of the same. This may include information which uniquely identifies the reader unit 28 and/or the vehicle or site where it is located. Memory 70 may also store information collected from one or more tag units 26.

Clock 72 functions primarily to support the measurement of time, either real-time or the lapsing of intervals. Clock 72 may be implemented as any suitable timing device, such as an oscillator circuit comprising a piezoelectric crystal. In one embodiment, clock 72 can function to generate an expiration timer signal after the lapse of a predetermined interval from the moment that reader unit 28 last communicated with a particular tag unit 26. The expiration timer signal signifies or represents the disconnection of a tractor 30 on which the reader unit 28 is located with a trailer 12 on which the tag unit 26 is located.

Vehicle sensor I/F 74 is coupled to one or more sensors located on a vehicle. These sensors monitor various conditions on board the vehicle. For example, the sensors may include various sensors to measure the temperature, oil, battery, or the like of an engine for the vehicle. Other sensors may be provided in addition to, or instead of, the exemplary sensors described above. Vehicle sensor I/F 74 provides processor 68 with up-to-date readings from the sensors.

Synchronization event detector 76 is coupled to processor 68. Synchronization event detector 76 functions primarily to detect a synchronization event. Preferably, this event is one which may occur substantially simultaneously on both a vehicle and a trailer 12. Synchronization event detector 76 generates a reader synchronization event signal which is input into processor 68. Such reader synchronization event signal is used to synchronize communication between reader unit 28 and a tag unit 26. In one embodiment, synchronization event detector 76 may be coupled to a standard seven-pin connector 36, in which case the synchronization event signal may comprise a brake signal, a turn signal, a hazard signal, or any of the like. Those skilled in the art of trailer communications understand that the coupling can be accomplished with a hardwire connection between the synchronization event detector 76 and any wire or combination of wires supporting the pins of the seven-pin connector 36.

Alarm out module 78 is also coupled to processor 68. Alarm out module 78 supports the output of an alarm signal, which may be generated by processor 68, to a party or entity which is able to provide assistance. Such alarm signal can be a 911 call, for example.

Relay unit I/F 80 is coupled to processor 68. Relay unit I/F 80 functions primarily to support communication between reader unit 28 and a relay unit 34 for the transmission and receipt of information, including, but not limited to identification information, status information, alarm information, and control information. Relay unit I/F 80 may comprise an RS-232 or RS-485 connection or port. Relay unit I/F 80 can support the transmission of a data-out signal by reader unit 28.

Power supply 82 is also coupled to processor 68. Power supply 82 functions primarily to provide power within reader unit 28. Power supply 82 may be implemented as a lithium battery, a solar cell, or any other suitable device or combination of devices for supplying power.

A ping generator 84 is also coupled to processor 68. Ping generator 84 functions primarily to generate a ping-out signal which is output by a reader unit 28 in order to activate or initiate communication with a tag unit 26. In one embodiment, ping generator 84 may comprise an ultrasonic transmitter operating at a suitable ultrasonic frequency. Such an ultrasonic transmitter may transmit signals effectively only at a relatively short distance, typically in the range of ten to fifteen feet, and in a limited arc of direction, typically between sixty to one hundred degrees.

Figure 4:
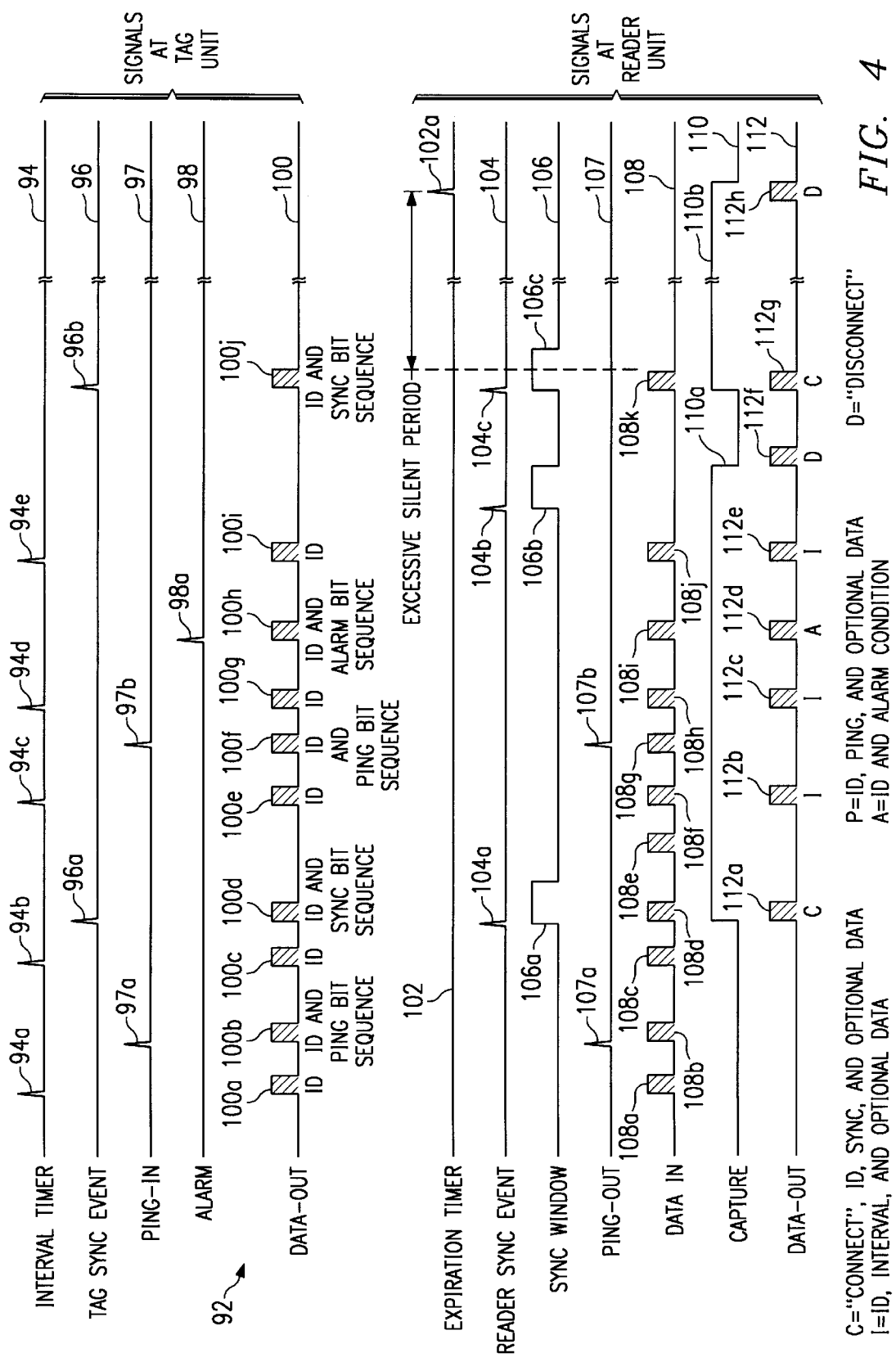
FIG. 4 is a timing diagram illustrating exemplary signals received by, generated, or occurring at a tag unit and a reader unit in accordance with the present invention.

FIG. 4 is a timing diagram 92 for various exemplary signals which may be generated or communicated during the operation of a tag unit 26 and a reader unit 28. In particular, an interval timer signal 94, a tag synchronization event signal 96, a ping-in signal 97, an alarm signal 98, and a data-out signal 100 can occur or be generated at tag unit 26. An expiration timer signal 102, a reader synchronization event signal 104, a synchronization window signal 106, a ping-out signal 107, a data-in signal 108, a capture signal 110, and a data-out signal 112 may occur or be generated at reader unit 28.

Interval timer signal 94 may comprise one or more interval pulses 94a–94e. These interval pulses 94a–94e can be generated by processor 40 of tag unit 26 upon the lapse of a predetermined interval, as measured by clock 44. The time between interval pulses 94a–94e may be pseudo-random pattern that is derived from the trailer identification. Because the trailer identification is preferably unique to each tag unit 26, the time between intervals pulses 94a–94e is also unique.

Tag synchronization event signal 96 may comprise one or more synchronization pulses 96a and 96b. Synchronization pulses 96a and 96b are generated by synchronization event detector 54 of tag unit 26 upon detection of a synchronization event, such as the application of a brake signal, occurring on board the trailer 12 on which tag unit 26 is located. Preferably, such a synchronization event also occurs substantially simultaneously on board a vehicle to which such trailer 12 is coupled.

Ping-in signal 97 comprises one or more ping-in pulses 97a and 97b. Ping-in pulses 97a and 97b are generated by ping event detector 56 in response to the detection of a ping event. A ping event may comprise a signal, such as an acoustic signal, output by a reader unit 28.

Alarm signal 98 comprises one or more alarm pulses, such as alarm pulse 98a. Alarm pulse 98a can be generated by any of sensor I/Fs 46–52 in response to the detection of an alarm event by any of the associated sensors located on board a trailer 12.

Data-out signal 100 comprises one or more data bursts 100a–100j, each of which may comprise a plurality of pulses for communicating information, such as identification information, status information, and alarm information, from tag unit 26. Each data burst 100a–100j may be associated with a particular message of information and may comprise multiple representations of that message; accordingly, more opportunity is provided for the receipt of the information contained within the message. These data bursts and their associated advantages are described below in more detail with reference to FIG. 5. Data bursts 100a–100j may be transmitted out of tag unit 26.

Each transmission of a data burst 100a–100j can be triggered by a pulse in any of interval timer signal 94, synchronization event signal 96, or alarm signal 98. In particular, each of the interval pulses 94a–94e, synchronization pulses 96a and 96b, ping-in pulses 97a and 97b, and alarm pulse 98a corresponds to or represents an activating event, which serves to activate tag unit 26. When activated, tag unit 26 transmits a corresponding data burst 100a–100j out via RF transceiver 38 and antenna 60. For example, data bursts 100a, 100c, 100e, 100g, and 100i in data-out signal 100 are initiated by interval pulses 94a–94e, respectively, in interval timer signal 94. Likewise, data bursts 100d and 100j in data-out signal 100 are initiated by synchronization pulses 96a and 96b, respectively, of synchronization event signal 96. Data bursts 100b and 100f are initiated by ping-in pulses 97a and 97b, respectively, of ping-in signal 97. Data burst 100h in data-out signal 100 is initiated by alarm pulse 98a of alarm signal 98.

At least a portion of the information conveyed in a particular data burst 100a–100j may depend upon the type of pulse which initiated such data burst. For example, data bursts related to an interval pulse, such as data bursts 100a, 100c, 100e, 100g, and 100i, may each comprise an interval bit sequence. Data bursts related to a synchronization pulse, such as data bursts 100d and 100j, may each comprise a synchronization bit sequence. Data bursts related to a ping-in pulse, such as data bursts 100b and 100f, may comprise a ping bit sequence. Data bursts related to an alarm pulse, such as data burst 100h, may comprise an alarm bit sequence. Each of the bit sequences comprises one or more bits of information which may be contained within a transmitted message associated with a data burst. As described in more detail herein, interval bit sequences, synchronization bit sequences, ping bit sequences, and alarm bit sequences can be used by a reader unit 28 to verify that the information contained in a data burst is valid—i.e., the information was intended to be received by that reader unit 28.

With regard to the signals occurring or generated at reader unit 28, expiration timer signal 102 comprises one or more expiration pulses, such as expiration pulse 102*a*. Each expiration pulse 102*a* is generated by processor 68 after the lapse of a predetermined interval (measured by clock 72) during which no communication has been received by reader unit 28. Such an event, which is considered to be excessive period of silence, can be construed to mean that the vehicle on which reader unit 28 is located is no longer connected to the trailer 12 on which tag unit 26 is located. Accordingly, the expiration pulse 102*a* represents a disconnect.

Reader synchronization event signal 104 comprises one or more synchronization pulses 104*a*–104*c*. Synchronization pulses 104*a*–104*c* are generated by synchronization event detector 76 of reader unit 28 upon detection of a synchronization event, such as the application of a brake signal, occurring on board the vehicle on which reader unit 12 is located.

Synchronization window signal 106 comprises one or more synchronization windows 106*a*–106*c*, each of which is generated in response to a corresponding synchronization pulse 104*a*–104*c* of reader synchronization event signal 106. Each synchronization window 106*a*–106*c* defines a "window" for communication which is opened after the detection of a synchronization event at reader unit 28. Information communicated during such windows 104*a*–104*c* is considered valid, whereas information that is communicated outside such windows is not considered valid. In one embodiment, validity of the information may also depend upon whether the transmission contains a synchronization bit sequence.

Ping-out signal 107 comprises one or more ping-out pulses, such as pulses 107*a* and 107*b*. Ping-out pulses 107*a* and 107*b*, which may be generated by ping generator 84, can be output from reader unit 28 in the form of acoustic signals. These signals are intended for receipt by ping event detector 56 of tag unit 26; the ping event detector 56 will generate a ping-in pulse in response to each acoustic signal detected. Accordingly, there is a correspondence between the ping-out pulses in ping-out signal 107 at reader unit 28 and the ping-in pulses in ping-in signal 97 at tag unit 26. In particular, as shown, ping-in pulses 97*a* and 97*b* correspond to ping-out pulses 107*a* and 107*b*, respectively.

Data-in signal 108 comprises one or more data bursts 108*a*–108*k* which may be received at RF transceiver 66. Each of these data bursts 108*a*–108*k* may comprise one or more pulses for conveying information from a corresponding tag unit 26. As shown, at least a portion of data bursts 108*a*–108*k* of data-in signal 108 correspond to data bursts 100*a*–100*j* of data-out signal 100.

A capture signal 110 may comprise one or more capture windows 110*a* and 110*b*. Generally, a capture window 110*a* or 110*b* corresponds to the connection of a vehicle (on which reader unit 28 is located) with a trailer 12. Thus, for example, each capture window 110*a* and 110*b* can be generated or "opened" under the following conditions: a data burst (of data-in signal 108) is received shortly after the occurrence of a reader synchronization event pulse (of reader synchronization event signal 104). A capture window may remain open until the vehicle associated with reader unit 28 is disconnected from trailer 12, as indicated by one of the following events: a reader synchronization pulse is not followed immediately by the receipt of a data burst of data-in signal 108 (for example, at the end of capture window 110*a*), or an expiration pulse 102*a* is generated after the lapse of an excessive silent period (for example, at the end of capture window 110*b*). Like synchronization windows 106*a*–106*c*, capture windows 110*a* and 110*b* each define a window for communicating with a corresponding tag unit 26. Capture windows, however, generally have a longer period than synchronization windows. In one embodiment, all data bursts 108*a*–108*k* which are not received during a capture window 110*a* or 110*b* will be deemed to contain invalid information. Thus, in FIG. 4, data bursts 108*a*, 108*b*, and 108*c* would be considered invalid because they do not occur during either capture window 110*a* or 110*b*.

Furthermore, not all data bursts 108*a*–108*k* received during a capture window will be automatically deemed to contain valid information. Rather, each capture window 110*a* and 110*b* may be specific to a particular tag unit 26. In particular, the data burst 108*a*–108*k* which opens a capture window will contain identification information for a specific tag unit 26. Any data burst 108*a*–108*k* which is received after the window has been opened must contain the same identification information; otherwise it will be deemed to contain invalid information. For example, data burst 108*e*, which does not correspond to any of data bursts 100*a*–100*j* in data-out signal 100, may be a spurious signal which does not have the appropriate identification information; accordingly, it will be deemed to contain invalid information. Interval bit sequences, ping bit sequences, and alarm bit sequences, by specifying the kind of event which caused the transmission of a data burst, are also used to validate information in data bursts 108*a*–108*k*. Specifically, if a data burst 108*a*–108*k* is received during a capture window 110*a* or 110*b* but not during a synchronization window 106*a*–106*c*, it should contain one of an interval bit sequence, a ping bit sequence, or an alarm bit sequence in order to be considered valid. In this way, the present invention provides an additional measure of protection against cross-talk.

A data-out signal 112 is generated at reader unit 28 in response to the other signals described above and appearing at reader unit 28. Data-out signal 112 comprises one or more data packets 112*a*–112*h* which contain a variety of information. This information includes identification information, status information, alarm information received from a tag unit 26 and validated at reader unit 28; furthermore, at least a portion of the information may specify the events which caused the data packets 112*a*–112*h* to be generated. For example, data packets 112*a* and 112*g* may each specify the connection of a vehicle to a trailer 12, identification information for that trailer 12, a synchronization bit sequence, and optional information, such as condition or status information, for the trailer. Data packets 112*b*, 112*c*, and 112*e* may each contain an interval bit sequence and specify identification information and optional information. Data packet 112*d* may contain an alarm bit and specify identification and alarm information. Data packets 112*f* and 112*h* may specify the disconnection of a trailer from a vehicle.

The information of data packets 112*a*–112*h* can be either transmitted out to a suitable relay unit 34 in order to update NSC 16 and/or hosts 24 or, alternatively, stored at reader unit 28 for downloading at a later time. Relay unit 34 may add other information, such as positioning information, to data packets 112*a*–112*h*. Accordingly, NSC 16 and/or hosts 24 receiving the data packets will be provided with a variety of information for monitoring, controlling, tracking, or otherwise managing trailer 12.

Figure 5:
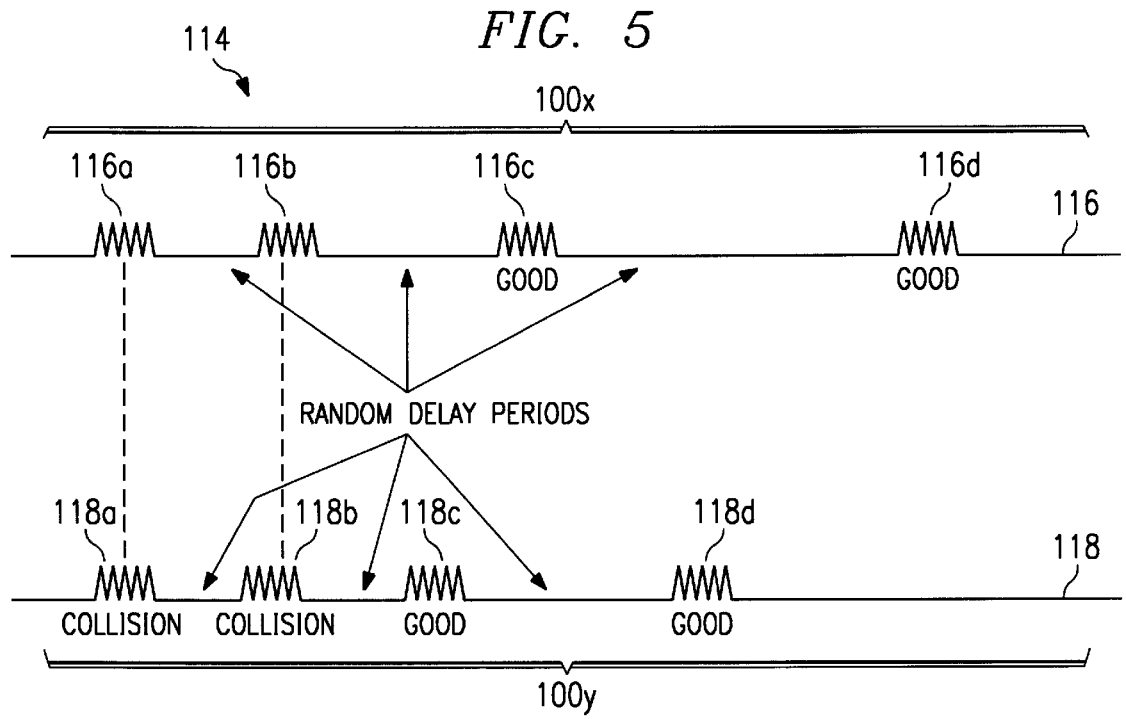
FIG. 5 is a timing diagram illustrating exemplary data signals generated by a first and second tag units in accordance with the present invention.

FIG. 5 is a timing diagram 114 illustrating exemplary signals which can be output by two tag units 26 in accordance with the present invention. In particular, a first data signal 116 may be output by first tag unit 26 and a second data signal 118 can be output by a second tag unit 26. Each of first data signal 116 and second data signal 118 can be transmitted out of the corresponding tag unit in the form of a data-out signal, such as data-out signal 100 shown in FIG. 4.

As shown, first data signal 116 comprises a number of pulse groups 116a–116d. All or a portion of these pulse groups can be contained within a single data burst 100x of the corresponding data-out signal transmitted from the first tag unit. Data burst 100x is similar to data bursts 100a–100j shown in FIG. 4. If data pulse groups 116a–116d are part of the same data burst, they may convey the same information. Pulse groups 116a–116d may be separated by non-uniform intervals.

Second data signal 118 comprises a number of data pulse groups 118a–118d, which can be contained within a data burst 100y of a corresponding data-out signal sent from the second tag unit. Data burst 100y is similar to data bursts 100a–100j shown in FIG. 4. Each data pulse group 118a–118d may convey the same information as every other data pulse group 118a–118d. Like data pulse groups 116a–116d of first data signal 116, data pulse groups 118a–118d of second data signal 118 are separated by non-uniform intervals.

Cross-talk may arise between first and second data signals 116 and 118 when one of data pulse group 116a–116d "collides" or occurs at the same time as one of data pulse group 118a–118d. As shown, data pulse groups 116a and 116b collide with data pulse groups 118a and 118b, respectively.

The present invention, however, provides some measure of protection against cross-talk. In one embodiment, the non-uniform intervals between pulse groups in each of first data signal 116 and second data signal 118 can be pseudo-randomly generated, for example, from an identification for the corresponding tag unit. That is, the intervals between pulse group 116a–116d may be derived from an identification for the first tag unit. Likewise, the intervals between pulse groups 118a–118d may be derived from an identification for the second tag unit. Because the data pulse groups in each of first and second data signals 116 and 118 are separated by pseudo-random intervals, not every pulse group 116a–116d will collide with a pulse group 118a–118d even when some of the pulse groups collide. For example, pulse groups 116c and 116d in first data signal 116 do not collide with any pulse groups in second data signal 118. Likewise, pulse groups 118c and 118d in second data signal 118 do not collide with any pulse groups in first data signal 116. The information carried in first and second data signals 116 and 118 can thus be received by suitable reader units 28.

In one embodiment, each tag unit 26 is operable to detect the collision of its transmissions with those of another tag unit 26, and then broadcast subsequent transmissions at pseudo-randomly generated intervals. Alternatively, in another embodiment, a reader unit 28 may detect the collision of transmissions broadcast by two or more tag units 26; the reader unit 28 may communicate with each of these tag units 26 to inform them that their transmissions are colliding. Each tag unit 26 may then generate and impose pseudo-random intervals between subsequent transmissions.

Figure 6:
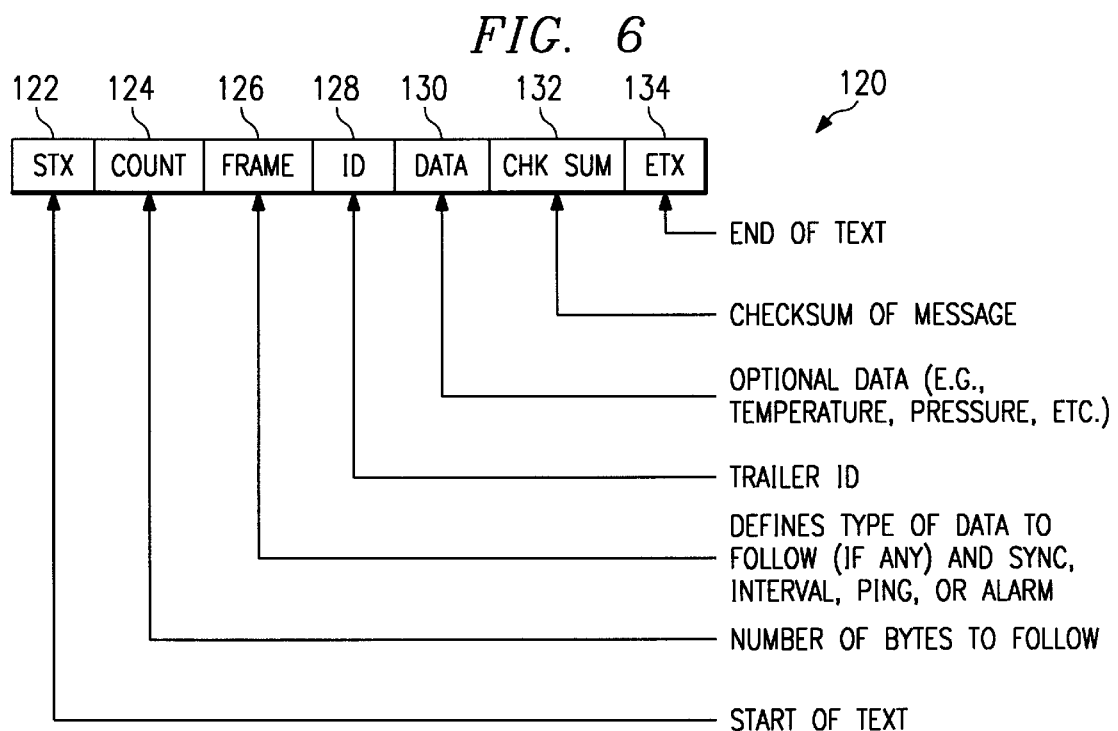
FIG. 6 illustrates an exemplary message format in accordance with the present invention.

FIG. 6 illustrates an exemplary message format 120 in accordance with the present invention. Information that is communicated from a tag unit 26 to a reader unit 28 may be formatted according to message format 120. Message format 120 includes a number of fields, each of which is provided for a specific purpose.

A start of text (STX) field 122 identifies the start of the data message or text. A count field 124 specifies the number of bytes contained in the data message which follows start of text field 122. A frame field 126 may define the type of data contained in the message. Frame field 126 can also specify or contain a synchronization bit sequence, an interval bit sequence, a ping bit sequence, or an alarm bit sequence, each of which may be used by a reader unit 28 to validate the information contained in the message. In one embodiment, the same bit positions in frame field 126 are used to support each of the synchronization, interval, ping, and alarm bit sequences; in such case, the bit sequences comprise different combinations of bits. For example, a synchronization bit sequence may comprise a binary "00"; an interval bit sequence may comprise a binary "01"; a ping bit sequence may comprise a binary "10"; and an alarm bit sequence may comprise a binary "11". In another embodiment, separate bit positions in frame field 126 are provided for each bit sequence; thus, for example, the first two bit positions are provided for the synchronization bit sequence, the second two bit positions are provided for the interval bit sequence, the third two bit positions are provided for the ping bit sequence, and the fourth two bit positions are provided for the alarm bit sequence.

An identification (ID) field 128 specifies an identification for the trailer 12 on which tag unit 26 is located; this identification may uniquely identify that particular trailer 12. A data field 130 can contain various data or information relating to the trailer 12. This information may include status information or alarm information for various conditions on board trailer 12, such as temperature, pressure, humidity, etc. In one embodiment, the information in data field 130 can be optional for each message. A checksum (CHK SUM) field 132 specifies a checksum of the message. An end of text (ETX) field 134 defines the end of the text or message.

Figure 7:
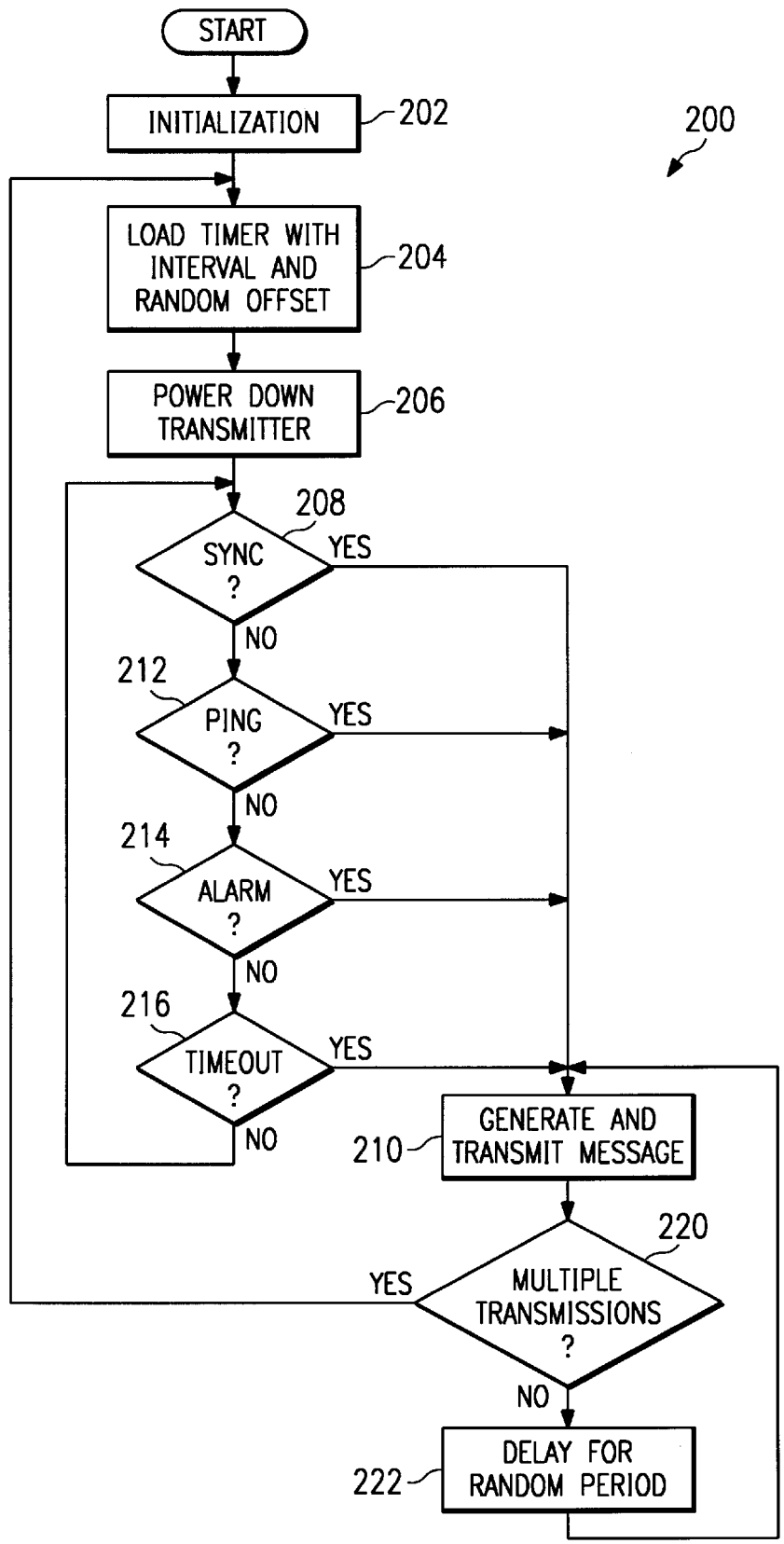
FIG. 7 is a flow diagram of an exemplary method for communicating information from a tag unit in accordance with the present invention.

FIG. 7 is a flow diagram of an exemplary method for communicating information from a tag unit 26 in accordance with the present invention. In one embodiment, method 200 corresponds to the operation of tag unit 26.

Method 200 begins at step 202 where tag unit 26 is initialized. Initialization may include loading software from internal memory 62 into processor 40. Initialization may also include storing an identification for the trailer 12 on which tag unit 26 is located. At step 204, processor 40 sets a timer contained therein so that the timer will activate tag unit 26 after the lapse of a predetermined interval. The predetermined interval can be fixed, varying, or pseudo-random and generated from the trailer identification. The timer is also set to measure a number of random or pseudo-random offsets after the interval has lapsed. Like the predetermined interval, the offsets may be derived from the trailer identification.

At step 206, processor 40 powers-down tag unit 26—i.e., places tag unit 26 in inactive mode—so that the amount of energy or power drawn from power supply 58 is reduced. In this way, the present invention conserves power or energy, thus prolonging the life of power supply 58.

Tag unit 26 remains in inactive mode until the occurrence of any one of various activating events, such as a synchronization event, a ping event, an alarm event, or a timeout event. Within tag unit 26, the signals for these activating events can be generated, relayed by, or received at any of synchronization event detector 54, ping event detector 56, sensor I/Fs 46–52, or clock 44.

If a synchronization event is detected by synchronization event detector 54 at step 208, it will generate a synchronization event pulse, which is input into processor 40. At step 210, processor 40 generates a data message, which can be sent out via RF transceiver 38 and antenna 60 in the form of a data burst. This message may include identification information uniquely identifying the trailer 12 on which tag unit 26 is located. In addition, various other "optional" information, such as status information or alarm information, may be included in the message. The message may also comprise a synchronization bit sequence. The message may be formatted according to the exemplary message format 120 illustrated and described above with reference to FIG. 6. Method 200 proceeds to step 220.

If no synchronization event has been detected at step 208, tag unit 26 checks for a ping event at step 212. If a ping event is detected by ping event detector 56, then the ping event detector will generate and input a ping-in pulse into processor 40. In response, processor 40 at step 210 generates a message, which may include identification information, optional information, and a ping bit sequence. The message is sent out of transceiver 38 and antenna 60, after which method 200 proceeds to step 220.

If a ping event has not been detected at step 212, tag unit 26 checks for an alarm event at step 214. If an alarm event is detected by one of sensor I/Fs 46–52, such sensor I/F will generate an alarm pulse sequence, which is input into processor 40. At step 210, processor 40 generates a message, which may contain identification information, optional information, and an alarm bit sequence, for transmission out of tag unit 26. The message is transmitted, after which method 200 proceeds to step 220.

If an alarm event has not been detected at step 212, tag unit 26 will check for a timeout—i.e., the lapse of a predetermined interval as measured by clock 44—at step 216. If a timeout has occurred, an interval pulse is generated and input into processor 40. At step 210, processor 40 may then generate and transmit a data message which contains identification information, optional information, and an interval bit sequence; afterwards, method 200 moves to step 220. Otherwise, if a timeout has not occurred, tag unit 26 returns to step 208, after which it will continue to cycle through steps 208–216 until at least one of a synchronization event, a ping event, an alarm event, or a timeout has been detected.

At step 220, processor 40 determines whether the message has been transmitted a predetermined number of times (e.g., three times). If the message has not been transmitted for this predetermined number of times, then at step 222 processor 40 delays for the random period or offset previously set into the timer at step 204; it should be understood that the random period may differ between transmissions. Afterwards, method 200 moves to step 210 where the message is transmitted again. Tag unit 26 continues to cycle through steps 220, 222, 210, and 218 until the message has been transmitted for the predetermined number of times. When processor 40 determines at step 220 that the predetermined number of transmissions have been sent, tag unit 26 returns to step 204 where the timer and interval are loaded along with an interval and random offset.

Figure 8:
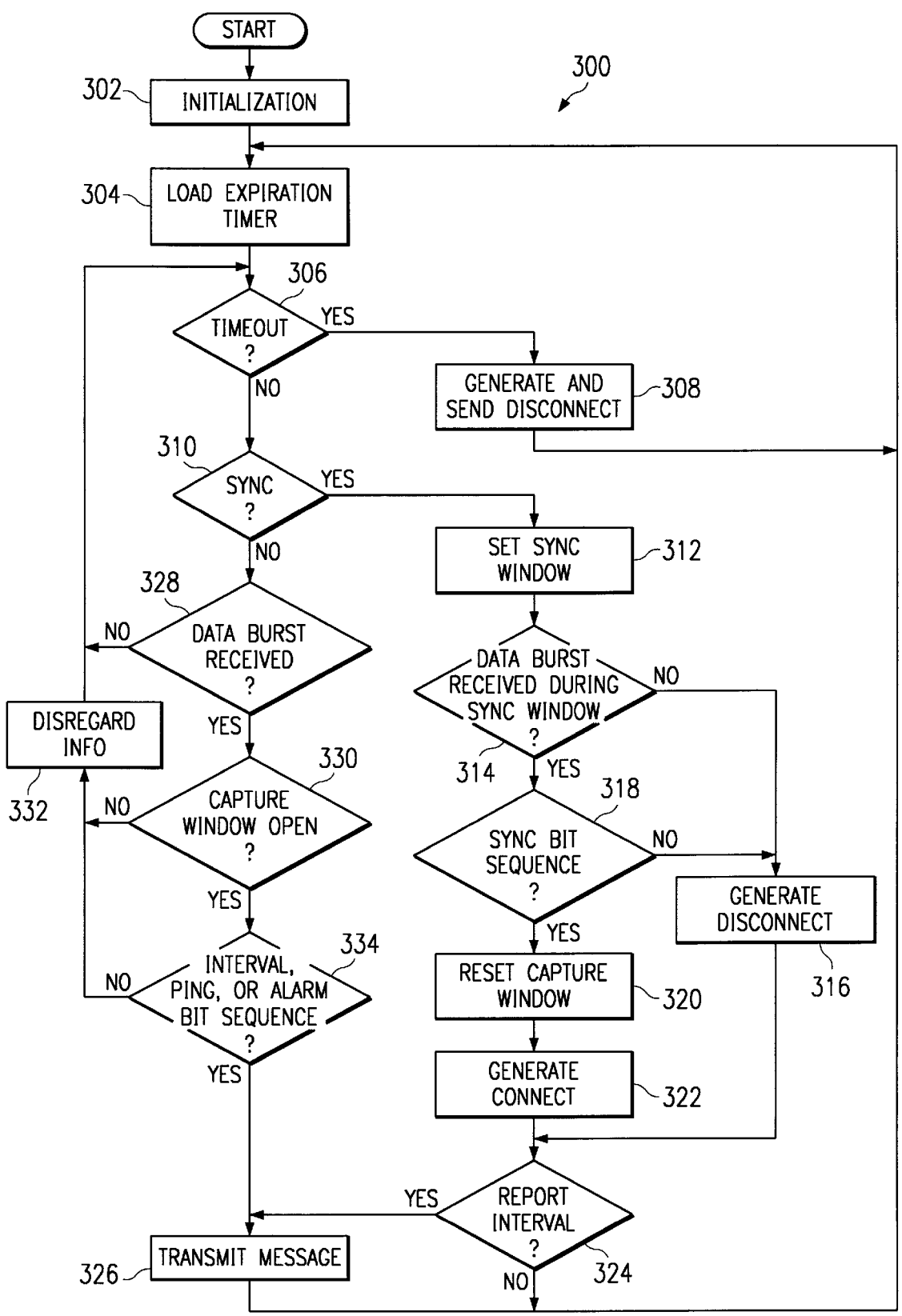
FIG. 8 is a flow diagram of an exemplary method for receiving information at a reader unit in accordance with the present invention.

FIG. 8 is a flow diagram of an exemplary method 300 for receiving information in accordance with the present invention. In one embodiment, method 300 may correspond to the operation of a reader unit 28 which can be disposed on a vehicle, such as a tractor 30.

Method 300 begins at step 302 where reader unit 28 is initialized. Initialization may include loading software from the internal memory 88 into processor 68. At step 304, processor 68 sets a timer contained therein so that the timer will output an expiration signal at a specified time after reader unit 28 has last communicated with a particular tag unit 26. This expiration signal may be interpreted as a disconnect between a vehicle on which the reader unit 28 is located and a trailer 12 on which the tag unit 26 is located.

At step 306, processor 68 determines whether a timeout has occurred—i.e., whether an expiration signal has been generated. If a timeout has occurred, processor 68 may command a response, and then at step 308, processor 68 generates and sends a disconnect message to an NSC 16 or hosts 24. The disconnect message notifies NSC 16 and/or hosts 24 that the vehicle on which reader unit 28 is located is no longer connected to the trailer 12 having the tag unit 26 with which the reader unit last communicated. Method 300 returns to step 304.

If a timeout has not occurred, reader unit 28 checks for a synchronization event at step 310. If synchronization event detector 76 has detected a synchronization event, then processor 68 sets or opens a synchronization window at step 312. Information communicated during such synchronization window is considered valid; information that is communicated outside such window may or may not be valid depending on other events, as discussed herein.

At step 314, processor 68 determines whether a data burst was received from a tag unit 26 during the synchronization window. If no data burst was received at RF transceiver 66 during the synchronization window, reader unit 28 generates a disconnect message at step 316. The disconnect message indicates or signals the disconnection of the vehicle (on which reader unit 28 is located) with a trailer 12. Method 300 then moves to step 324.

Otherwise, if a data burst was received during the synchronization window, then at step 318 processor 68 determines whether a synchronization bit sequence is contained within the data burst that was received. If no synchronization bit sequence is contained in the received data burst, then reader unit 28 generates a disconnect message at step 316, after which method 300 moves to step 324.

Alternatively, if a synchronization bit sequence is contained within the received data burst, processor 68 resets a capture window at step 320. A capture window corresponds to the connection of the vehicle with a particular trailer 12, and may be specific to that trailer 12. A capture window may remain open until a timeout has occurred—i.e., an expiration signal has been generated. For the reset of a capture window, reader unit 28 resets the timer for the expiration signal and stores an identification for the trailer 12 which transmitted the data burst. At step 322, reader unit 28 generates a connect message, after which method 300 moves to step 324.

At step 324, processor 68 determines whether a reporting interval has expired. This reporting interval is maintained so that information will not be transmitted out of reader unit 28 every time that a synchronization event is detected. For example, if the synchronization event comprises a brake signal, then in areas and/or times of heavy traffic (e.g., major cities during rush hour) a synchronization event may occur every few seconds. If the reporting interval has not expired, then method 300 returns to step 304 where the expiration timer is loaded. Alternatively, if the reporting interval has expired, then reader unit 28, using relay unit I/F 80, transmits a suitable message out to NSC 16 and/or hosts 24 at step 326. This message may specify the connection or disconnection of a trailer 12, identification information for the trailer, and any other information, such as status information. Method 300 then returns to step 304.

Referring again to step 310, if no synchronization event was detected, then at step 328 processor 68 determines whether a data burst has been received at RF transceiver 66. If no data burst was received, method 300 returns to step 306 where processor 68 determines whether a timeout has occurred. Otherwise, if a data burst has been received, then at step 330 processor 68 determines whether a capture window is currently open. As described above, a capture window is specific to a particular trailer 12 and defines a window for communicating with a tag unit 26 provided on that trailer 12. If a capture window is not currently open, the information contained in the data burst should be treated as invalid; thus, at step 322 reader unit 28 disregards the information. Method 300 then returns to step 306.

Otherwise, if a capture window is currently open, processor 68 determines whether any of an interval bit sequence, a ping bit sequence, or an alarm bit sequence is contained within the data burst that was received. If none of these bit sequences appears in the data burst along with appropriate identification information, then the information contained in the data burst should be treated as invalid. Thus, at step 322 reader unit 28 disregards the information. Alternatively, if one of the bit sequences appears in the data burst along with appropriate identification information, then reader unit 28 transmits a message at step 326. Specifically, processor 68 cooperates with relay unit I/F 80 to pass the identification information and any other information contained in the data burst, such as status or alarm information, to NSC 16 and/or hosts 24. Afterwards, method 300 returns to step 304 where the expiration timer is loaded.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A trailer communications system comprising:
   a tag unit for location on a trailer;
   a reader unit at a remote location; and
   the tag unit and the reader unit operable to communicate information during a window for communication established in response to a predetermined event which occurs substantially simultaneously at both the trailer and the remote location, wherein the information communicated between the tag unit and the reader unit outside the window is considered invalid.

2. The system of claim 1, wherein the remote location comprises a vehicle coupled to the trailer.

3. The system of claim 2, wherein the predetermined event comprises an event supported by a seven-pin connector between the trailer and the vehicle.

4. The system of claim 2, wherein the predetermined event comprises the application of brakes on the trailer and the vehicle.

5. The system of claim 1, further comprising at least one sensor located on the trailer and coupled to the tag unit, the sensor operable to monitor at least one of temperature, humidity, and pressure within the trailer.

6. The system of claim 1, wherein the tag unit comprises:
   a memory operable to store information relating to the trailer;
   a detector operable to detect the predetermined event; and
   a transmitter coupled to the memory and the detector, the transmitter operable to transmit the information stored in the memory in response to the detection of the predetermined event.

7. The system of claim 1, wherein the tag unit operates in an inactive mode to conserve power and an active mode to communicate information.

8. The system of claim 7, wherein the tag unit comprises:
   a detector operable to detect the predetermined event; and
   a processor coupled to the detector, the processor operable to transition the tag unit from the inactive mode to the active mode in response to the detection of the predetermined event.

9. The system of claim 1, wherein each of the tag unit and the reader unit communicates using radio frequency.

10. The system of claim 1, wherein the predetermined event comprises one of a synchronization event, a ping event, an alarm event, or the lapse of a predetermined interval.

11. The system of claim 1, further comprising a relay unit in communication with the reader unit, the relay unit operable to relay the information communicated between the tag unit and the reader unit to a host.

12. The system of claim 11, wherein the relay unit is further operable to provide positioning information for locating the trailer.

13. The system of claim 1, wherein the tag unit comprises at least one control interface operable to provide control information to at least one conditioning device on the trailer.

14. The system of claim 13, wherein the control interface provides control information to at least one of a refrigeration unit, a humidifier, and an anti-shock device.

15. The system of claim 1, wherein the window for communication is initiated by a first synchronization event and is terminated by a second synchronization event.

16. The system of claim 1, wherein:
   the tag unit comprises a particular one of a number of tag units;
   the window for communication is associated with the particular tag unit;
   the information comprises first data having an identifier associated with the particular tag unit and second data not having an identifier associated with the particular tag unit; and
   the second data not having an identifier associated with the particular tag unit is considered invalid.

17. The system of claim 1, wherein the tag unit comprises a first tag unit and the information communicated by the first tag unit to the reader unit comprises information communicated to the first tag unit by a second tag unit located on a second trailer.

18. A tag unit for location on a trailer, the tag unit operating in either an inactive mode or an active mode, the tag unit comprising:
   a memory operable to store information relating to the trailer;
   an activating event detector operable to detect an activating event which occurs substantially simultaneously at the trailer and a remote location;
   a processor coupled to the memory and the activating event detector, the processor operable to transition the tag unit from inactive mode to active mode in response to the detection of an activating event; and
   a transmitter coupled to the processor, the transmitter operable to transmit the information stored in the memory during a window for communication established in response to the detection of the activating event by the activating event detector, wherein the information communicated between the tag unit and the remote location outside the window is considered invalid.

19. The tag unit of claim 18, further comprising at least one sensor interface, the sensor interface operable to relay information generated by a sensor to the processor.

20. The tag unit of claim 19, wherein the sensor monitors at least one of temperature, humidity, and pressure within the trailer.

21. The tag unit of claim 18, wherein the activating event detector comprises one of a synchronization event detector, a ping event detector, or a sensor interface.

22. The tag unit of claim 18, wherein the activating event comprises an event supported by a seven-pin connector between the trailer and the vehicle.

23. The tag unit of claim 18, wherein the activating event comprises one of a synchronization event, a ping event, an alarm event, or the lapse of a predetermined interval.

24. The tag unit of claim 18, wherein the transmitter communicates using radio frequency.

25. The tag unit of claim 18, further comprising at least one control interface operable to provide control information to at least one conditioning device on the trailer.

26. The tag unit of claim 25, wherein the control interface provides control information to at least one of a refrigeration unit, a humidifier, and an anti-shock device.

27. The tag unit of claim 18, wherein the window for communication is initiated by a first synchronization event and is terminated by a second synchronization event.

28. The tag unit of claim 18, wherein the tag unit comprises a first tag unit and the information comprises information communicated to the first tag unit by a second tag unit located on a second trailer.

29. A method for communicating with a trailer comprising:

detecting a predetermined event which occurs substantially simultaneously at both the trailer and a remote location;

specifying a window for communication between a tag unit on the trailer and a reader unit at the remote location in response to the detection of the predetermined event; and communicating information from the tag unit to the reader unit, wherein information communicated between the tag unit and the reader unit outside the window is considered invalid.

30. The method of claim 29, wherein the remote location comprises a vehicle coupled to the trailer.

31. The method of claim 30, wherein the predetermined event comprises an event supported by a seven-pin connector between the trailer and the vehicle.

32. The method of claim 30, wherein the predetermined event comprises the application of brakes on the trailer and the vehicle.

33. The method of claim 29, further comprising the step of transitioning the tag unit from an inactive mode to an active mode in response to the detection of the predetermined event.

34. The method of claim 29, wherein the information comprises control information, and further comprising communicating the control information from the tag unit to a conditioning device on the trailer.

35. The method of claim 29, wherein:

the predetermined event comprises a first synchronization event and a second synchronization event; and the step of specifying a window for communication comprises initiating the window for communication in response to the first synchronization event and terminating the window for communication in response to the second synchronization event.

36. The method of claim 29, wherein:

the tag unit comprises a particular one of a number of tag units;

the window for communication is associated with the particular tag unit;

the information comprises first data having an identifier associated with the particular tag unit and second data not having an identifier associated with the particular tag unit; and the second data not having an identifier associated with the particular tag unit is considered invalid.

37. The method of claim 29, wherein the tag unit comprises a first tag unit and the information communicated by the first tag unit to the reader unit comprises information communicated to the first tag unit by a second tag unit located on a second trailer.

* * * * *